United States Patent
Rainville

(10) Patent No.: US 11,142,447 B2
(45) Date of Patent: Oct. 12, 2021

(54) MOBILE AUTONOMOUS HYDROGEN REFUELING STATION

(71) Applicant: Bell Helicopter Textron Inc., Fort Worth, TX (US)

(72) Inventor: Joseph Dean Rainville, Fort Worth, TX (US)

(73) Assignee: Textron Innovations Inc., Providence, RI (US)

(*) Notice: Subject to any disclaimer, the term of this patent is extended or adjusted under 35 U.S.C. 154(b) by 0 days.

(21) Appl. No.: 16/214,784

(22) Filed: Dec. 10, 2018

(65) Prior Publication Data

US 2020/0180940 A1 Jun. 11, 2020

(51) Int. Cl.
| | |
|---|---|
| *B67D 7/04* | (2010.01) |
| *B64D 37/30* | (2006.01) |
| *B64F 1/28* | (2006.01) |
| *B64D 37/04* | (2006.01) |
| *B64D 37/16* | (2006.01) |

(52) U.S. Cl.
CPC ............ *B67D 7/0401* (2013.01); *B64D 37/04* (2013.01); *B64D 37/16* (2013.01); *B64D 37/30* (2013.01); *B64F 1/28* (2013.01); *B64C 2201/024* (2013.01); *B64C 2201/027* (2013.01); *B67D 2007/0417* (2013.01); *B67D 2007/0419* (2013.01)

(58) Field of Classification Search
CPC .......... B67D 7/0401; B67D 2007/0417; B67D 2007/0419; B67D 7/845; B67D 7/44; B67D 7/445; B67D 7/46; B67D 7/465; B67D 7/42; B64D 37/16; B64D 37/30; B64F 1/28; B64C 2201/027; B64C 2201/024; F17C 13/084; Y02E 60/321; B67C 7/42; B67C 3/2631; B67C 3/2628; B67C 3/2625; B67C 3/2622; B67C 3/262; B67C 3/2617; B05B 11/0097; B05B 11/00446; B05B 11/0005
USPC ......................................... 141/231, 113, 192
See application file for complete search history.

(56) References Cited

U.S. PATENT DOCUMENTS

| | | | | |
|---|---|---|---|---|
| 4,665,955 A | * | 5/1987 | Horvath ............... | B67D 7/0401 141/1 |
| 4,681,144 A | * | 7/1987 | Horvath ................. | B60K 15/04 141/1 |
| 4,881,581 A | * | 11/1989 | Hollerback ............ | B60K 15/04 141/113 |

(Continued)

OTHER PUBLICATIONS

United States Army Acquisiton Support Center, "Joint Precision Airdrop System (JPADS)", Jun. 9, 2017, [Retrieved on Feb. 6, 2019 . Retrieved from the Internet URL: https://web.archive.org/web/20170609103539/https://asc.army.mil/web/portfolio-item/cs-css-joint-precision-airdrop-system-jpads/] (Year: 2017).*

(Continued)

*Primary Examiner* — Marina A Tietjen
*Assistant Examiner* — Stephanie A Shrieves
(74) *Attorney, Agent, or Firm* — Lightfoot & Alford PLLC

(57) ABSTRACT

A system and a method for mobilized autonomous hydrogen refueling of vertical lift aircraft using a framed landing pad with sensors, an onboard hydrogen storage tank, an onboard refueling arm configured to couple the hydrogen storage tank to the aircraft and an onboard controller configured to control a flow of fuel from the hydrogen storage tank to the aircraft.

6 Claims, 4 Drawing Sheets

(56) References Cited

U.S. PATENT DOCUMENTS

| | | | | |
|---|---|---|---|---|
| 6,237,647 | B1* | 5/2001 | Pong | B67D 7/0401 |
| | | | | 141/231 |
| 6,459,231 | B1* | 10/2002 | Kagatani | H01M 8/065 |
| | | | | 320/101 |
| 7,178,565 | B2* | 2/2007 | Eichelberger | B60S 5/02 |
| | | | | 141/39 |
| 7,891,387 | B2* | 2/2011 | Lim | A47L 9/2894 |
| | | | | 141/98 |
| 9,387,928 | B1* | 7/2016 | Gentry | B64C 39/024 |
| 9,701,425 | B2* | 7/2017 | Lee | B64F 1/362 |
| 2002/0014277 | A1* | 2/2002 | Togasawa | F16K 17/30 |
| | | | | 141/95 |
| 2003/0230671 | A1* | 12/2003 | Dunn | B64D 27/24 |
| | | | | 244/53 R |
| 2004/0055664 | A1* | 3/2004 | Horvath | B60K 15/04 |
| | | | | 141/98 |
| 2011/0024559 | A1* | 2/2011 | McGeer | B64F 5/40 |
| | | | | 244/110 F |
| 2014/0124621 | A1* | 5/2014 | Godzdanker | B64F 1/28 |
| | | | | 244/110 E |
| 2015/0123462 | A1* | 5/2015 | Kamradt | B64C 39/024 |
| | | | | 307/9.1 |
| 2016/0304217 | A1* | 10/2016 | Fisher | B64F 1/222 |
| 2016/0376020 | A1* | 12/2016 | Lewis | B64D 39/06 |
| | | | | 244/135 A |
| 2017/0129464 | A1* | 5/2017 | Wang | B64C 39/024 |
| 2017/0240291 | A1* | 8/2017 | Kim | H01M 8/2475 |
| 2017/0327091 | A1* | 11/2017 | Capizzo | H01M 10/32 |
| 2018/0107219 | A1* | 4/2018 | Harris | G05D 1/0094 |
| 2018/0196418 | A1* | 7/2018 | Meier | G05D 1/0225 |
| 2018/0229852 | A1* | 8/2018 | Boss | B64C 39/024 |
| 2019/0077521 | A1* | 3/2019 | Kelly | B64F 1/28 |

OTHER PUBLICATIONS

United States Army Acquisition Support Center, "Joint Precision Airdrop System (JPADS)", Jun. 9, 2017, [Retrieved on Feb. 6, 2019. Retrieved from the Internet URL: https://asc.army.mil/web/portfolio-item/cs-css-joint-precision-airdrop-system-jpads/] (Year: 2017).*

* cited by examiner

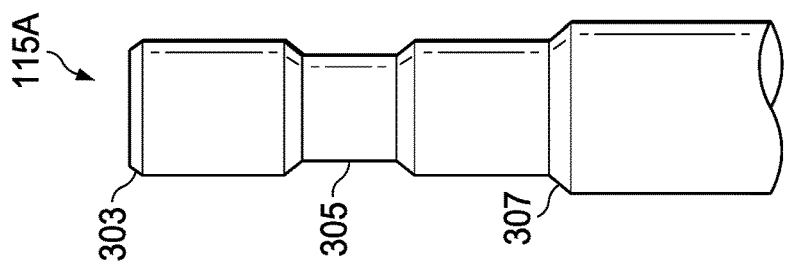
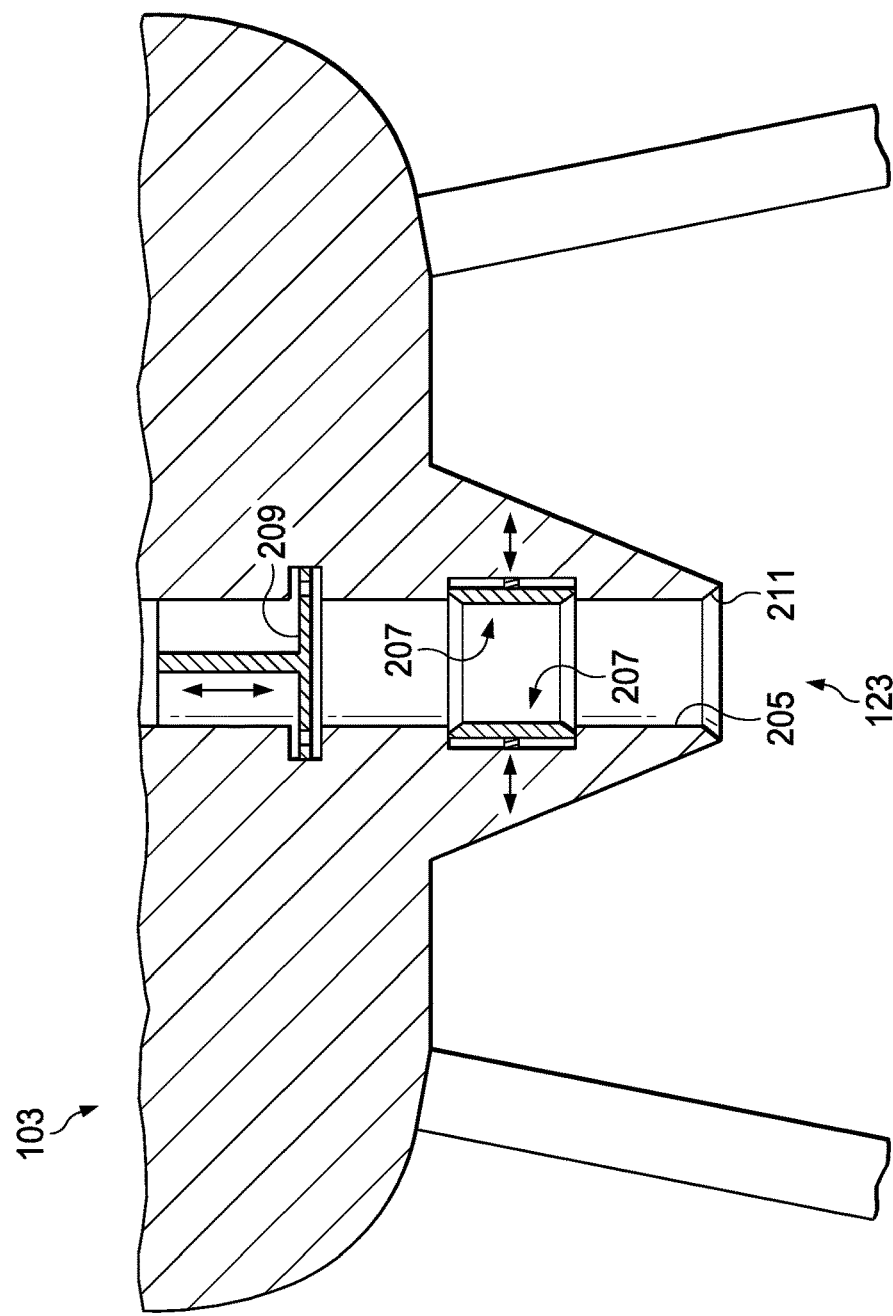

MOBILE AUTONOMOUS HYDROGEN REFUELING STATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

A fuel level of a drone limits the operation of the autonomous aircraft. Conventional systems and methods to refuel autonomous vertical-lift aircraft limit the autonomous nature of the aircraft. Furthermore, conventional refueling systems are typically constrained by their immoveable location. Alternatively, conventional mobile refueling systems, such as those on a truck, require human interaction and limit the autonomous nature of autonomous vertical-lift aircraft.

BRIEF DESCRIPTION OF THE DRAWINGS

FIG. 2 is a partial section view of a rotorcraft according to this disclosure.

FIG. 3 is a partial side view of a refueling arm nozzle according to this disclosure.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A mobile autonomous refueling system enables drones and air taxis to fly to a fuel source and refill their fuel tank without a human present at the site of refueling. Autonomous refueling systems can operate around the clock, without the need for a break, and in all weather conditions. Configuring the autonomous refueling system to be mobile provides fuel quickly where the autonomous vertical-lift aircraft are operating. During an operation, as the operating theater of autonomous aircraft moves, the supply chain of fuel can move as well. Moving the supply chain of fuel increases the efficiency of the aircraft because their return trip for fuel is shorter by flying to a mobile refueling source. Mobile autonomous refueling systems provide benefits for both civilian and military operations. For example, mobile refueling systems can be deployed scout drones just behind a leading edge of a military force as it crosses a region. Alternatively, as a hurricane crosses a region mobile refueling systems to fuel rescue drones can be deployed. Deployment in remote areas to extend the range of commercial drones for package delivery, extended surveying, and/or surveillance range.

Figure 1:
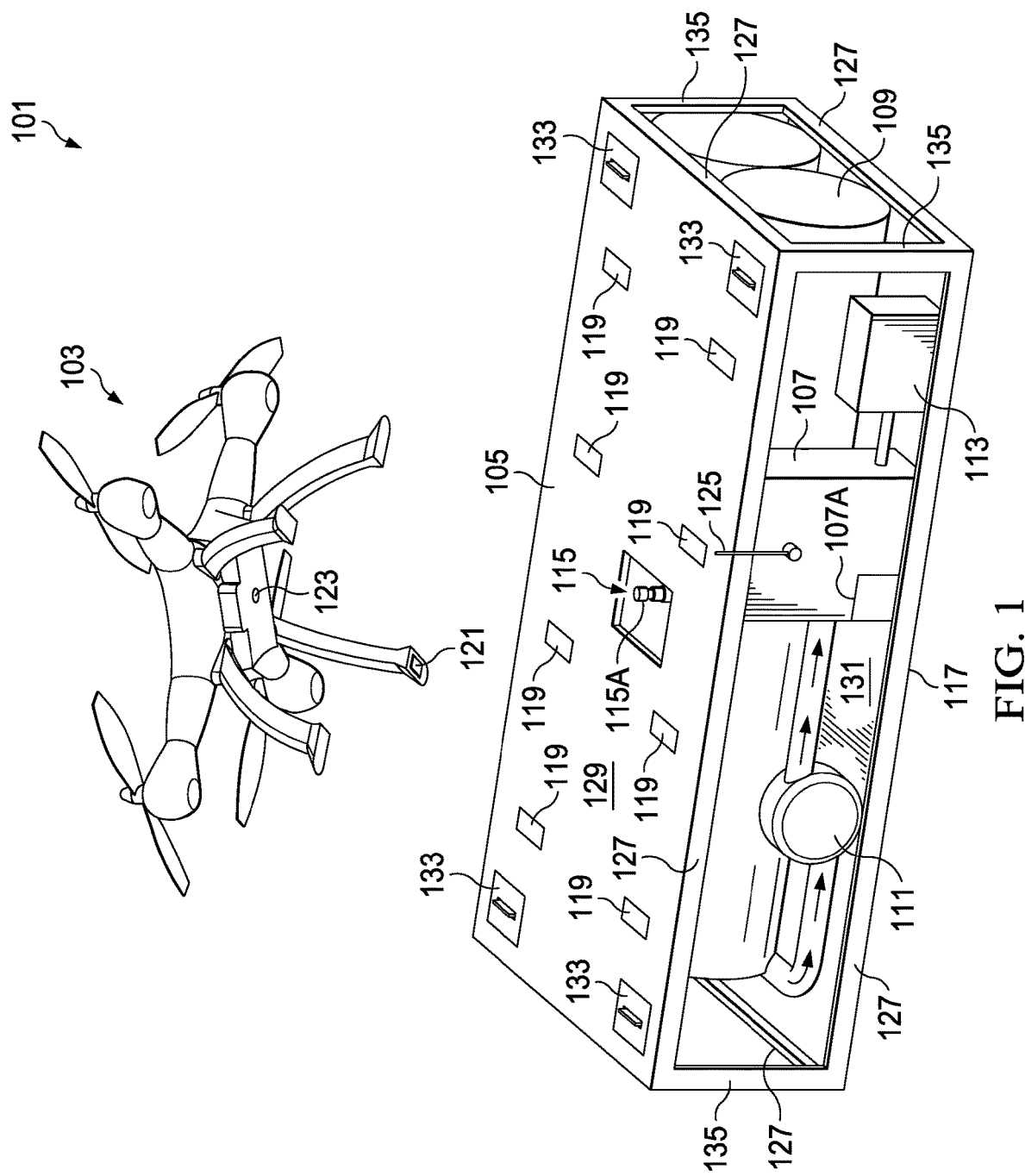
FIG. 1 is an oblique view of a mobile autonomous hydrogen refueling station system according to this disclosure.

FIG. 1 illustrates a mobile autonomous hydrogen refueling system 101 according to this disclosure. The autonomous hydrogen refueling system 101 comprises an aircraft 103, a mobile landing pad 105, a controller 107, a valve 107A, at least one hydrogen storage tank 109, a compressor 111, a power source 113, a refueling arm 115, a nozzle 115A of the refueling arm 115, and a frame 117. The aircraft 103 approaches the mobile landing pad 105 and communicates to the controller 107 regarding refueling needs. While aircraft 103 is illustrated as a small drone, other autonomous vertical-lift aircraft are contemplated by this application. Aircrafts such as helicopters, quadcopters, tail-sitters, VTOL )Vertical Takeoff and Landing) aircraft, and tiltrotors are configurable to accept fuel from system 101.

A position of the aircraft 103 relative to the mobile landing pad 105 is detected by fixed sensors 119 located on the mobile landing pad 105 and airborne sensors 121 located on the aircraft 103. The sensors are a combination of proximity sensors and optical sensors and enable the aircraft 103 and the controller 107 to determine a location of the aircraft 103 relative to the refueling arm 115. The positional data related to the aircraft 103 enables both the controller 107 and the aircraft 103 to collectively center a recessed receptacle 123 of the aircraft 103 over the refueling arm 115. Refueling arm 115 translates vertically in response to the controller 107 moving an actuator (not shown), thereby allowing the system 101 to adjust to aircraft 103 of varying heights. As illustrated, the refueling arm 115 is recessed into the frame 117 until extended. Aircraft 103 translates longitudinally and laterally to position the aircraft 103 relative to the refueling arm 115. Refueling arm 115 couples to the recessed receptacle 123 associated with an underside surface of aircraft 103 once extended from a recessed position into an extended position.

Hydrogen fuel from the hydrogen storage tank 109 is compressed by compressor 111 and regulated by controller 107 before it flows into aircraft 103 through refueling arm 115. Typically, hydrogen fuel is stored at 5,000 psi to 10,000 psi in the hydrogen storage tank 109. Compressor 111 increases the pressure of the hydrogen fuel as needed to refuel the aircraft 103. Preferably the hydrogen fuel located in the hydrogen storage tank 109 is in a gas state, although other states of hydrogen are contemplated by this application. For example, the hydrogen could be stored as a liquid or as a solid until converted into a gas form for fueling the aircraft 103. Power source 113 is typically a fuel cell fed from hydrogen storage tank 109. The fuel cell converts the hydrogen fuel into electricity to power the system 101. Alternatively, the power source 113 is a rechargeable battery supply fed from solar cells (not shown) located on the frame 117. Additionally, pressurized hydrogen fuel stored in the hydrogen storage tank 109, for example at 10,000 psi, can pneumatically fill several drones operating at 4,500 psi without the need for using compressor 111.

Controller 107 is configured to communicate with the aircraft 103 via a wireless system 125. Data such as connection status, amount of hydrogen stored in the hydrogen storage tank 109, and/or amount of time spent refilling the aircraft 103 is transmitted between the aircraft 103 and the controller 107. Controller 107 actuates valve 107A to allow hydrogen gas to refuel the aircraft 103. Controller 107 commands an actuator (not shown) to extend and retract the refueling arm 115 as needed. Also, data such as a connection status, an amount of hydrogen stored in the hydrogen storage tank 109, an amount of time spent refilling each aircraft is transmitted between the aircraft 103 and the controller 107.

Frame 117 enables the various subsystems of system 101 to be closely located and deployed from a flying aircraft. For example, in a first embodiment, the frame is sized like a commercial pallet. In a second embodiment, the frame is sized like a military pallet. A larger frame is harder to deploy but contains more hydrogen fuel, inversely a smaller frame is easier to deploy but carries less hydrogen fuel. The frame 117 comprises horizontal members 127, along with an upper plate 129 and a lower plate 131, attachment members 133, and vertical members 135. Located on the upper plate 129 are the attachment members 133. Attachment members 133 are configured to enable the frame 117 to be moved and deployed. Attachment members 133 are typically recessed eyelets capable of supporting the weight of system 101.

FIG. 2 illustrates aircraft 103 equipped with the recessed receptacle 123 according to this disclosure. Recessed receptacle 123 is centrally located on an underside surface of aircraft 103. Other locations for recessed receptacle 123 are contemplated. Recessed receptacle 123 is configured to accept fuel from an autonomous refueling system by being able to be coupled to the refueling arm 115. As illustrated, the recessed receptacle 123 comprises a conduit 205 that is in fluid communication with a fuel tank (not shown) on the aircraft 103, a clamping system 207, a check valve 209, and a beveled edge 211. While the recessed receptacle 123 is illustrated as being recessed within the aircraft 103, it should be apparent that the recessed receptacle 123 may protrude or be recessed depending upon the aircraft requirements.

The clamping system 207 is configured to allow the aircraft 103 to clamp onto the nozzle 115A of the refueling arm 115. In the preferred embodiment, the clamping system 207 is remotely actuated by the aircraft 103 electronically. Alternatively, the clamping system 207 is purely mechanical and engages and disengages based upon the force applied by the aircraft 103 onto the refueling arm 115. In use, the aircraft 103 approaches the refueling arm 115 and lands such that the nozzle 115A of the refueling arm 115 is inserted into the recessed receptacle 123. The aircraft 103 then activates the clamping system 207 and applies a force to the nozzle 115A of the refueling arm 115. Once refueling is complete, the clamping system 207 disengages and the aircraft 103 can decouple from the refueling arm 115 and then take off. While the clamping system 207 is illustrated on the aircraft 103, alternatively a clamping system is located on the refueling arm 115 and applies a force to the recessed receptacle 123 of aircraft 103.

Check valve 209 is located between the clamping system 207 and the fuel tank on the aircraft 103. Typically, check valve 209 is selected to actuate based upon a pressure of hydrogen at 5 k psi. Other values of check valves are contemplated as determined by a pressure of the hydrogen storage tank 109, the rotorcraft's requirements, and other considerations. Once the aircraft 103 has coupled the recessed receptacle 123 to the nozzle 115A of the refueling arm 115, then hydrogen gas can then flow towards the check valve 209. The check valve 209 will only move if the pressure of the hydrogen gas is at least 5 k psi to ensure only high-pressure hydrogen is accepted. Furthermore, check valve 209 also releases pressure in case of over-pressurization. For example, check valve 209 dumps extra hydrogen gas after decoupling from nozzle 115A or for defueling the aircraft.

FIG. 3 illustrates the nozzle 115A of the refueling arm 115 according to this disclosure. Nozzle 115A is located on a tip of the refueling arm 115 and is an end of a conduit that originates at the hydrogen storage tank 109. Nozzle 115A is configured to mate with the recessed receptacle 123 and comprises a beveled edge 303, a circular recess 305, and a flare 307. Beveled edge 303 facilitates alignment issues between the aircraft 103 and the refueling arm 115. Circular recess 305 is configured to receive clamping forces from a clamping system such as clamping system 207. Flare 307 mates with a beveled edge of the recessed receptacle 123 such as beveled edge 211.

Figure 4:
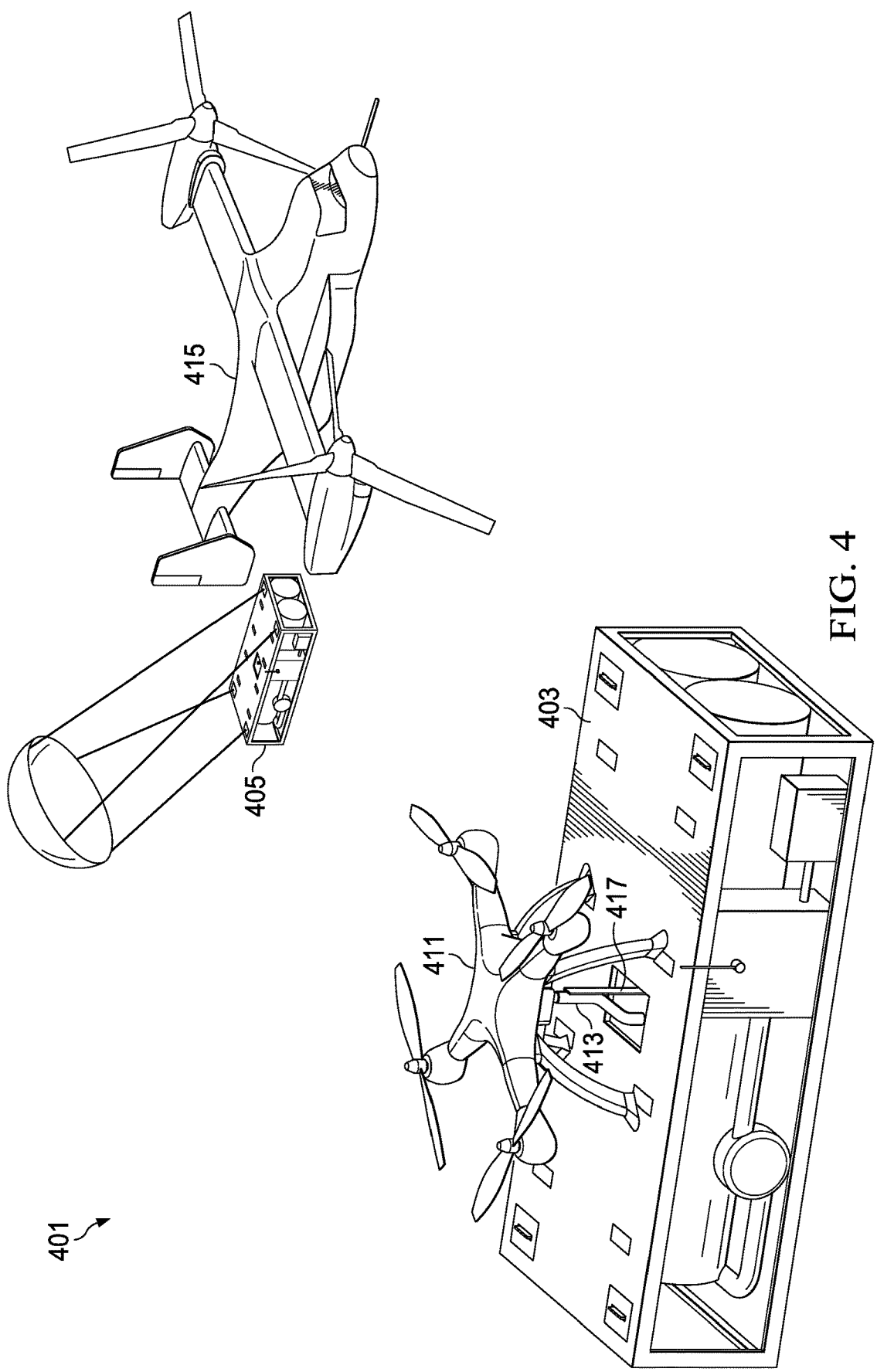
FIG. 4 is an oblique view of another mobile autonomous hydrogen refueling station system according to this disclosure.

FIG. 4 illustrates a distributed autonomous hydrogen refueling system 401 according to this disclosure. The distributed autonomous hydrogen refueling system 401 comprises a first mobile landing pad 403 and a second mobile landing pad 405. First aircraft 411 is coupled to a refueling arm 413 of the first mobile landing pad 403. The second mobile landing pad 405 has been deployed via parachute from a second aircraft 415.

Refueling arm 413 is limited to a single degree-of-freedom resulting from actuator 417 being limited to providing movement along a single axis. Actuator 417 extends the refueling arm 413 from being recessed inside the system 401 to being extended outside the system 401. Preferably the first aircraft 411 lands upon first mobile landing pad 403 and then the actuator 417 extends the refueling arm 413 to mate the first aircraft 411 to the system 401. Alternatively, the refueling arm 413 is extended by the actuator 417 before the aircraft lands on the first mobile landing pad 403 and mates to the refueling arm 413. Additionally, multiple refueling arms 413 can be carried by system 401 to refuel multiple aircrafts or multiple tanks on a single aircraft concurrently.

Figure 5:
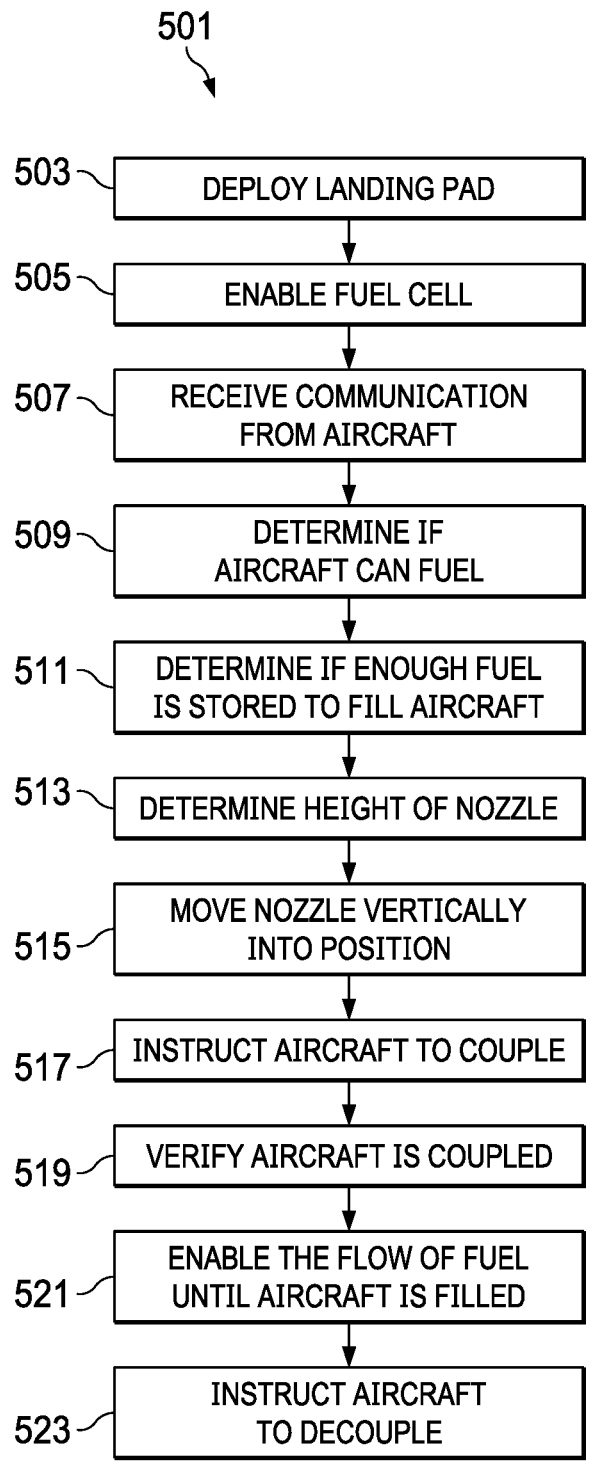
FIG. 5 is a diagram of a method of mobilized autonomous hydrogen refueling according to this disclosure.

FIG. 5 illustrates a method of autonomous hydrogen refueling 501 according to this disclosure. First, at block 503 the mobile landing pad is deployed. For example, the mobile landing pad could be trucked in or dropped by parachute. Second, at block 505 the fuel cell is enabled by opening a valve between the fuel cell and the hydrogen storage tank. Initially, the mobile landing pad would have enough stored power, such as electrical energy stored in a battery system, to enable valves once deployed. Waiting until the mobile landing pad is on the ground to release any of the hydrogen gas increases the safety of the system.

Now the mobile landing pad is ready for operation. Next, at block 507 the autonomous refueling system receives a communication from the aircraft relaying the aircraft's need for hydrogen fuel, then at block 509 the system determines if the aircraft can refuel. For example, the system verifies the aircraft's recessed receptacle is capable of coupling to the refueling arm. Next at block 511, the system determines if the hydrogen storage tank contains enough hydrogen fuel to adequately refuel the aircraft. After the system has determined enough fuel is stored, then at block 513 the system determines a required height of the nozzle. The aircraft provides identifying information to the system to enable the system to determine a height of the nozzle. Once a height is calculated then at block 515 the system extends the refueling arm to the proper position for coupling. The system then at block 517 instructs the aircraft to land at a specific location on the mobile landing pad and couple to the nozzle of the refueling arm. Alternatively, the system waits for the aircraft to land on the mobile landing pad, then extends the refueling arm, and finally couples to the nozzle. In the preferred embodiment, the aircraft clamps to the nozzle of the refueling arm. The system then at block 519 performs a verification that the aircraft has properly coupled. Once the verification was performed, the system at block 521 enables the flow of fuel until the aircraft is refilled. After the aircraft is refilled at block 523 the system instructs the aircraft to decouple and clears the aircraft for take-off.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A method for mobilized autonomous refueling of an aircraft comprising:
    deploying a mobile landing pad having;
        a refueling arm; and
        a nozzle on the refueling arm;
    landing the aircraft on the nozzle;
    coupling the nozzle to the aircraft;
    flowing fuel to the aircraft through the refueling arm;
    decoupling the nozzle from the aircraft; and
    determining a height of the nozzle;
    wherein the determining the height of the nozzle is based upon a communication from the aircraft.

2. The method of claim 1, further comprising:
    adjusting the height of the nozzle based upon the communication from the aircraft.

3. The method of claim 1, further comprising:
    verifying the aircraft is coupled before flowing fuel to the aircraft.

4. The method of claim 1, further comprising:
    verifying enough fuel is stored before landing the aircraft.

5. The method of claim 1, wherein the deploying step occurs from an aircraft.

6. The method of claim 1, wherein the deploying step occurs from a truck.

* * * * *